United States Patent
Huang (10) Patent No.: US 12,467,810 B2
(45) Date of Patent: Nov. 11, 2025

(54) COMBINED TYPE INNER DIAPHRAGM PRESSURE GAUGE AND MOUNTING ASSEMBLY

(71) Applicant: ZHONGSHAN FUMAO SEALS-TECH CO., LTD., Guangdong (CN)

(72) Inventor: Chang-Ching Huang, Guangdong (CN)

(73) Assignee: ZhongShan FuMao Seals-tech Co., Ltd., ZhongShan (CN)

( * ) Notice: Subject to any disclaimer, the term of this patent is extended or adjusted under 35 U.S.C. 154(b) by 317 days.

(21) Appl. No.: 18/114,994

(22) Filed: Feb. 28, 2023

(65) Prior Publication Data

US 2023/0273082 A1    Aug. 31, 2023

(30) Foreign Application Priority Data

Feb. 28, 2022  (CN) .......................... 202210189198.7

(51) Int. Cl.
*G01L 7/08* (2006.01)

(52) U.S. Cl.
CPC .................................... *G01L 7/082* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052;
(Continued)

(56) References Cited

U.S. PATENT DOCUMENTS

| 5,181,422 A | * | 1/1993 | Leonard | ................... G01L 19/10 |
| | | | | 73/431 |
| 5,970,796 A | * | 10/1999 | Blake | ..................... G01L 7/084 |
| | | | | 73/715 |

(Continued)

FOREIGN PATENT DOCUMENTS

| CN | 207395951 U | * | 5/2018 |
| CN | 109141725 A | | 1/2019 |

(Continued)

OTHER PUBLICATIONS

Office Action Dated Mar. 25, 2024 for Corresponding Chinese Patent Application No. 202210189198.7.

(Continued)

*Primary Examiner* — Andre J Allen (57) ABSTRACT

A combined type inner diaphragm pressure gauge includes a support seat, wherein an accommodating cavity is formed inside the support seat, a dial is disposed on top of the support seat, the dial is fixedly connected with an upper surface of the support seat, a center pin is disposed inside the support seat, an pointer is fixedly connected with a top end of the center pin, an inner diaphragm is disposed inside the support seat, the accommodating cavity is covered by the inner diaphragm, and an outer gasket is fixedly connected with an outer side of the inner diaphragm. A mounting assembly is further provided.

13 Claims, 4 Drawing Sheets

(58) Field of Classification Search
CPC ....... G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

| | | | |
|---|---|---|---|
| 11,346,739 B2* | 5/2022 | Huang | G01L 19/16 |
| 11,604,109 B1* | 3/2023 | Huang | G01L 19/142 |
| 2015/0185097 A1* | 7/2015 | Huang | G01L 7/08 73/715 |
| 2018/0180505 A1* | 6/2018 | Zipp | G01L 7/043 |
| 2019/0094092 A1* | 3/2019 | Lee | G01L 7/082 |

FOREIGN PATENT DOCUMENTS

| | | | |
|---|---|---|---|
| CN | 110068417 A | | 7/2019 |
| CN | 209446206 U | | 9/2019 |
| TW | 558348 U | * | 4/2018 |
| TW | 625438 U | * | 4/2022 |

OTHER PUBLICATIONS

Office Action Dated Dec. 24, 2024 for Corresponding Chinese Patent Application No. 202210189198.7.

(56) References Cited

OTHER PUBLICATIONS

Office Action Dated Apr. 21, 2025 for Corresponding Chinese Patent Application No. 202210189198.7.

* cited by examiner

COMBINED TYPE INNER DIAPHRAGM PRESSURE GAUGE AND MOUNTING ASSEMBLY

CROSS-REFERENCE TO RELATED APPLICATIONS

The present application claims priority of Chinese Patent Application No. 202210189198.7, filed on Feb. 28, 2022, the entire contents of which are hereby incorporated by reference.

TECHNICAL FIELD

The present invention relates to a technical field of an inner diaphragm pressure gauge, in particular, to a combined type inner diaphragm pressure gauge and a mounting assembly.

DESCRIPTION OF THE PRIOR ART

Inner diaphragm pressure gauges are suitable for measuring the pressure of liquids, gases or vapors that have no explosion hazard, do not crystallize, do not solidify, have a high viscosity, but have no corrosive effect on copper and copper alloys, or for measuring the pressure or negative pressure of various fluid media with certain corrosive, non-solidifying or amorphous fluids. Corrosion resistance depends on the material the inner diaphragm.

However, an inner diaphragm made of a single material of copper alloy or steel material can not resist strong acid and alkali, and an inner diaphragm only using fluorine material can resist strong acid and alkali, but does not have elastic properties of steel materials. Moreover, as described in the patent with the publication number CN207395951U, these two kinds of materials can not be completely combined and cannot detect both positive and negative pressures at the same time.

And due to the external communication with the chamber of the pressure gauge, the existing inner diaphragm pressure gauge, when applied to food processing equipment, for example mounted to pressure cookers, coffee machines or other food processing equipment, food substances are easy to enter the inner cavity of the pressure gauge because the measured pressure source often contains the food substances. Therefore, after a long time, it will not only affect food hygiene, but also cause the problem of inaccurate measurement of the inner membrane gauge.

SUMMARY OF THE DISCLOSURE

In view of the deficiencies of prior art, the present invention provides a combined type inner diaphragm pressure gauge and a mounting assembly, which solves the problem that food is easy to enter the inner cavity of the pressure gauge, resulting in unsafe food hygiene and inaccurate measurements.

To achieve the above object, the present invention is realized by the following technical solutions. The combined type inner diaphragm pressure gauge comprises a support seat, wherein an accommodating cavity is formed inside the support seat, a dial is disposed on top of the support seat, the dial is fixedly connected with an upper surface of the support seat, a movement is disposed inside the accommodating cavity, a center pin is disposed inside the support seat, an pointer is fixedly connected with a top end of the center pin, an inner diaphragm is disposed inside the support seat, the accommodating cavity is covered by the inner diaphragm, and an outer gasket made of flexible material is fixedly connected with an outer side of the inner diaphragm.

Preferably, the support seat comprises a top wall, a side wall is fixedly connected with a peripheral edge of the top wall, a fixing ring is fixedly connected with a lower end of the side wall, and a groove is disposed inside the fixing ring.

Preferably, the movement comprises a center seat, a rear end of the central seat is fixedly connected to a central position of the inner diaphragm by a riveting structure, a front end of the center seat is connected with a screw seat, the center pin is disposed inside the center seat, the top end of the center pin is fixedly connected with a pointer holder, a side surface of the pointer holder is fixedly connected with the pointer, a hairspring is disposed on the side surface of the pointer holder and below the pointer, one end of the hairspring is fixedly connected with the support seat, a crossbar is fixedly connected with the center pin and below the pointer holder, the crossbar is provided with a baffle at one end away from the center pin, and the baffle is fixedly connected with the top wall.

Preferably, an upper surface of the dial is provided with a scale, and an upper end of the center pin extends above the dial.

Preferably, the inner diaphragm is an elastic metal diaphragm, and the outer gasket is made of one or combination of two of Teflon, silicone rubber, fluorine rubber, perfluor rubber or Buna-N rubber, the inner diaphragm and the outer gasket are directly closely bonded by a couplant together.

Preferably, edges of the outer gasket and the inner diaphragm are clamped together via the groove inside the fixing ring.

Preferably, a connecting seat is fixedly connected with an outer surface of the fixing ring, a sealing washer is disposed at a junction of the connecting seat and the fixing ring, a case is fixedly connected with an upper surface of the connecting seat, and a transparent cover is fixedly connected with a top end of the case.

Preferably, the upper surface of the case is provided with an annular gland, and the transparent cover is located below the annular gland.

A mounting assembly having a combined type inner diaphragm pressure gauge, comprises the pressure gauge as mentioned above and a pressure wall for mounting the pressure gauge, the pressure wall is provided with an opening engaged with the connection seat, and the opening communicates with a pressure zone inside the pressure wall.

The connecting seat of the pressure gauge is engaged in the opening, and the outer gasket faces the pressure zone inside the pressure wall, thereby a pressure source at the pressure zone directly applies pressure to the outer gasket and the inner diaphragm.

The present invention provides a combined type inner diaphragm pressure gauge and a mounting assembly. The present invention has the following beneficial effects:

The pressure gauge of the present invention is constructed that the outer gasket does not have an inner cavity, which can avoid the substance of the pressure source from entering the pressure gauge, thereby reducing the accumulation of residual substances on the inner wall of the existing pressure gauge, and making the food production testing safer.

According to the present invention, by forming a combined type inner diaphragm with a metal inner diaphragm and a flexible outer gasket, the outside of the metal inner diaphragm can be selected according to the use environment to achieve better performance, and pressure values and vacuum values can be measured.

According to the present invention, by mounting the pressure gauge directly on the pressure wall to make the pressure source directly push the combined type inner diaphragm, so as to achieve easy maintenance.

REFERENCE NUMBERS 10, support seat; 11, top wall; 12, side wall; 13, fixing ring; 14, accommodating cavity; 15, groove; 16, baffle; 20, dial; 21, scale; 30, movement; 31, center pin; 32, center seat; 33, screw seat; 34, pointer holder; 35, hairspring; 36, crossbar; 40, pointer; 50, inner diaphragm; 60, outer gasket; 70, connecting seat; 71, case; 72, transparent cover; 73, thread-locking structure; 74, annular gland; 75, sealing washer; 80, pressure wall; 81, opening; 82, pressure zone; 100, inner case; 101, inner diaphragm; 102, center seat; 103, screw seat; 104, center pin; 105, pointer holder; 106, pointer; 107, dial; 108, outer gasket; 1081, inner cavity; 1082, threaded pipe.

DESCRIPTION OF EMBODIMENTS

In the following, in conjunction with the accompanying drawings in embodiments of the present invention, the technical solutions in the embodiments of the present invention will be clearly and completely described. Obviously, the described embodiments are only a part of the embodiments of the present invention, not all embodiments. Based on the embodiments in the present invention, all other embodiments obtained by those of ordinary skill in the art without making creative labor, fall within the scope of the protection of the present invention.

EMBODIMENTS

As shown in FIGS. 1-4, a combined type inner diaphragm pressure gauge and a mounting assembly provided by embodiments of the present invention comprises a support seat 10 which comprises a top wall 11. A side wall 12 is fixedly connected with the peripheral edge of the top wall 11. A fixing ring 13 is fixedly connected with the lower end of the side wall 12, and a groove 15 is disposed inside the fixing ring 13 for fixing the position of the inner diaphragm 50 and the outer spacer 60.

An accommodating cavity 14 is formed inside the support seat 10, and a dial 20 is disposed on top of the support seat 10. The dial 20 for displaying pressure information during operation is fixedly connected with an upper surface of the support seat 10. The upper surface of the dial 20 is provided with a scale 21, and the upper end of a center pin 31 extends above the dial 20. A movement 30 which comprises a center seat 32 is disposed inside the accommodating cavity 14. The rear end of the central seat 32 is fixedly connected to a central position of the inner diaphragm 50 by a riveting structure, and the front end of the center seat 32 is connected with a screw seat 33. The center pin 31 is disposed inside the center seat 32. The top end of the center pin 31 is fixedly connected with a pointer holder 34 in order to mount pointer 40. The side surface of the pointer holder 34 is fixedly connected with the pointer 40, by which a current pressure value can be determined. A hairspring 35 is disposed on the side surface of the pointer holder 34 and below the pointer 40. One end of the hairspring 35 is fixedly connected with the support seat 10. A crossbar 36 is fixedly connected with the center pin 31 and below the pointer holder 34 to limit a reset position. The crossbar 36 is provided with a baffle 16 at one end away from the center pin 31. The baffle 16 is fixedly connected with the top wall 11, so that the pointer is at the zero-scale line after each reset.

The center pin 31 is disposed inside the support seat 10, and the top end of the center pin 31 is fixed connected with the pointer 40. The inner diaphragm 50 is disposed inside the support seat 10, which deforms due to pressure and bears pressure. The inner diaphragm 50, being an elastic metal diaphragm, covers the accommodating cavity 14. An outer gasket 60 made of flexible material is fixedly connected with the outer side of the inner diaphragm 50. The outer gasket 60 is made of one or combination of two of Teflon, silicone rubber, fluorine rubber, perfluor rubber or Buna-N rubber. The inner diaphragm 50 and the outer gasket 60 are directly closely bonded by a couplant together. Edges of the inner diaphragm 50 and the outer gasket 60 are clamped via the groove 15 inside the fixing ring 13.

A connecting seat 70 is detachably connected with an outer surface of the fixing ring 13. A sealing washer 75 is disposed at the junction of the connecting seat 70 and the fixing ring 13, forming a sealed mechanism. A case 71 is fixedly connected with the upper surface of the connecting seat 70, and a transparent cover 72 is fixedly connected with the top end of the case 71, so that readings can be viewed easily.

Figure 1:
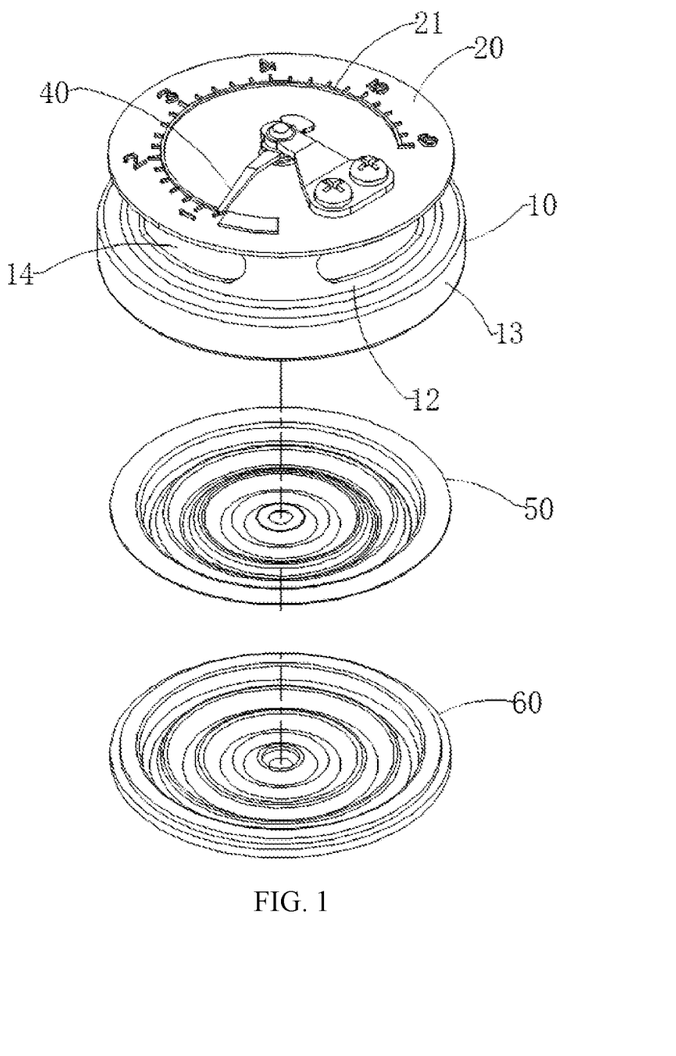
FIG. 1 is an exploded perspective view of the of the combined type inner diaphragm pressure gauge according to the present invention.
Figure 2:
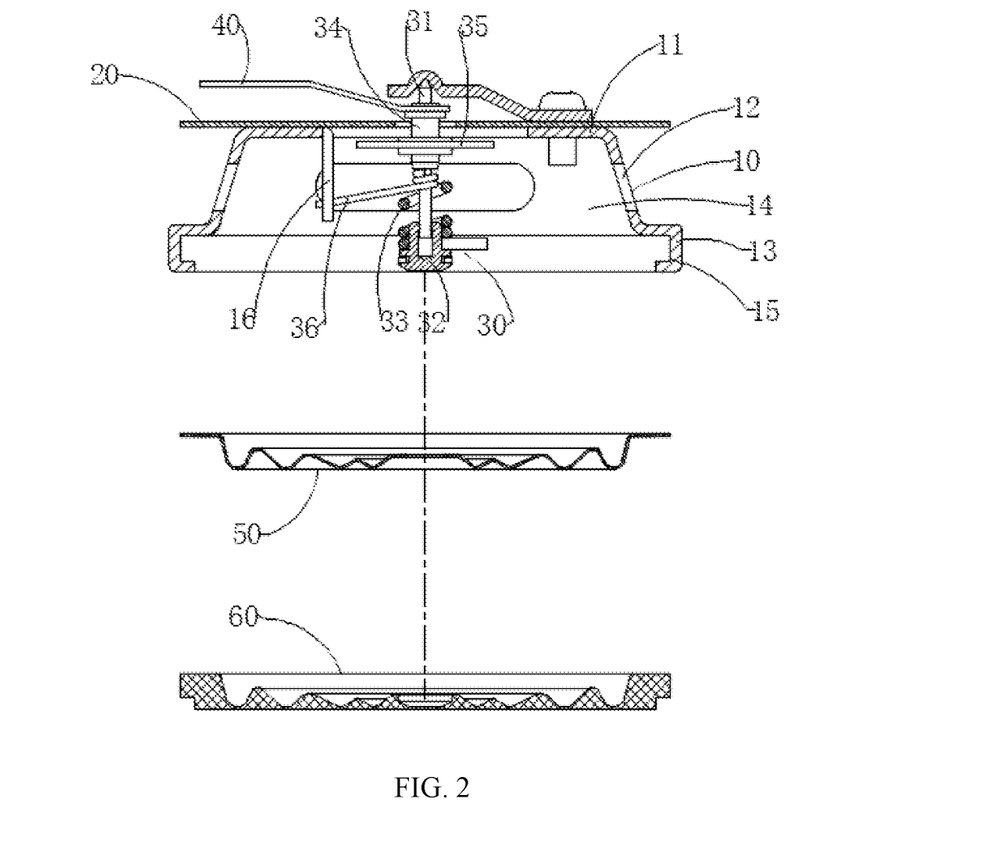
FIG. 2 is an exploded cross-sectional view of the of the combined type inner diaphragm pressure gauge according to the present invention.
Figure 3:
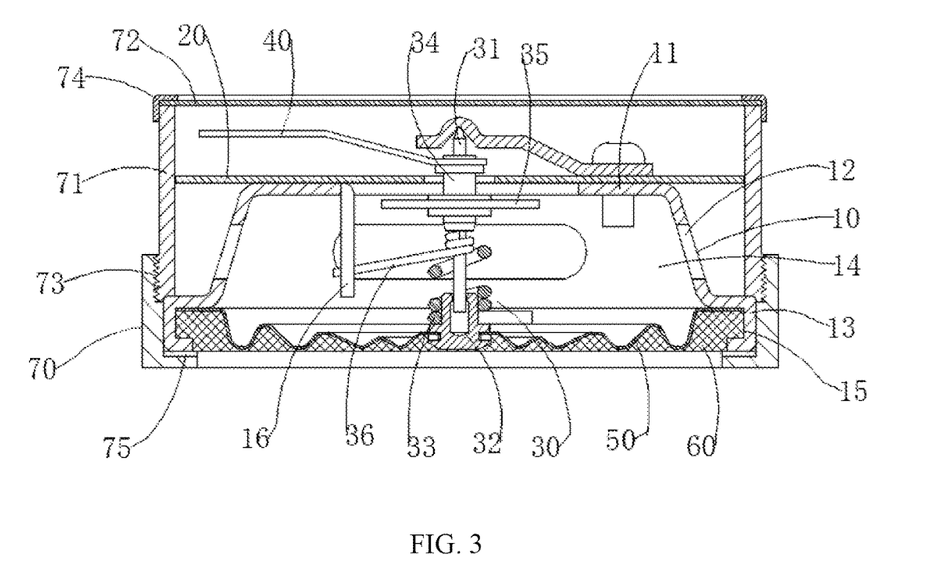
FIG. 3 is a combination cross-sectional view of the of the combined type inner diaphragm pressure gauge according to the present invention.
Figure 4:
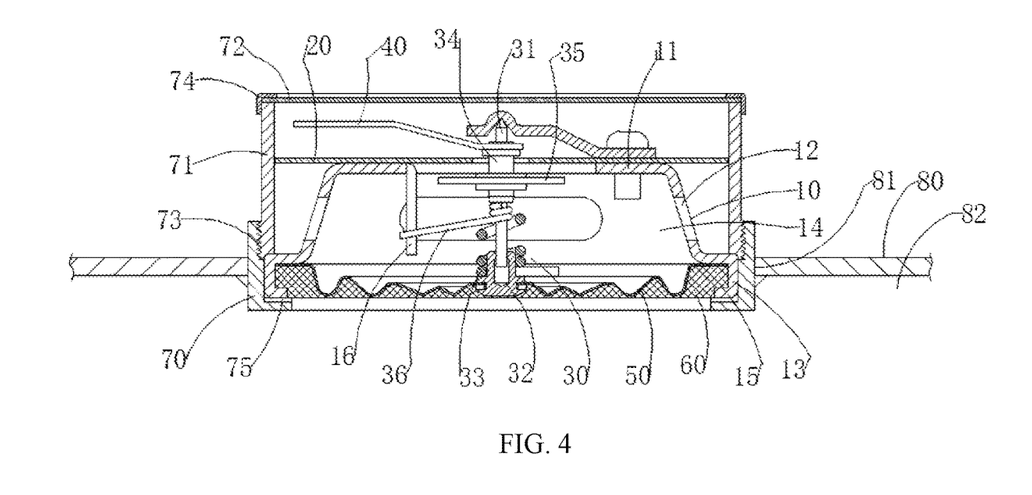
FIG. 4 is mounting combination structural view of the of the combined type inner diaphragm pressure gauge according to the present invention.

A mounting assembly having a combined type inner diaphragm pressure gauge comprises the pressure gauge above and a pressure wall 80 for mounting. The pressure wall 80 is provided with an opening 81 matches the connection seat 70, and the opening 81 communicates with a pressure zone 82 inside the pressure wall 80.

The connecting seat 70 of the pressure gauge is combined with the opening 81, and the outer gasket 60 faces the pressure zone 82 inside the pressure wall 80, thereby a pressure source at the pressure zone 82 directly applies pressure to the outer gasket 60 and the inner diaphragm 50.

Working principle: in use, the pressure gauge is mounted inside the opening 81 of the pressure wall 80, and is fixedly connected with the pressure wall 80; due to the opening 81 communicates with the pressure zone 82, the pressure directly acts on the outer gasket 60 via the pressure zone 82; hence, the pressure is applied to the outer gasket 60 and the inner diaphragm 50, so that the pressure gauge measures the pressure, and the external measured substance will not enter the pressure gauge.

EXAMPLES FOR COMPARISON

Figure 5:
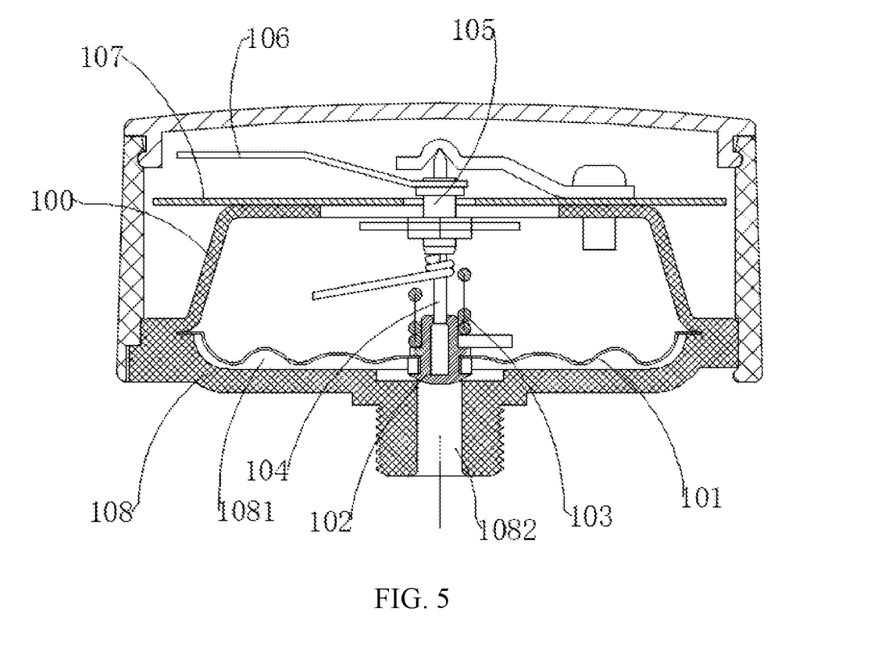
FIG. 5 is a schematic diagram of the proportional structure.

As shown in FIG. 5, the structure of an existing inner diaphragm pressure gauge includes an inner case 100. An inner diaphragm 101 is disposed at the lower end of the inner case 100, and a center seat 102 is disposed at the center of the inner diaphragm 101. A rotating seat 103 is disposed at the outer surface of the center seat 102 and a center pin 104 is disposed at the interior of the center seat 102. The upper end of the center pin 104 runs through the inner shell 100, and a pointer holder 105 is disposed at the proximal upper end of the center pin 104. A pointer 106 is disposed at the side surface of the pointer holder 105. A dial 107 is fixedly connected with the upper surface of the inner case 100, and the pointer 106 rotates above the dial 107. An outer gasket 108 is disposed at the lower end of the inner case 100, and the inner gasket 108 is provided with an inner cavity 1081 adjacent to the inner diaphragm 101. A threaded pipe 1082 communicating with the inner cavity 1081 is disposed at the lower end of the outer gasket 108.

Working principle: the threaded pipe 1082 is attached lockedly to items such as pressure cookers, so that the pressure in the pressure cooker enters the inner cavity 1081 through the threaded pipe 1082, and then pushes the inner diaphragm 101 to deform, to push the screw seat 103, so that the pointer 106 rotates, and the user view the reading to obtain the corresponding pressure.

It can be seen from the above that during the use of the pressure gauge in this example, the food substance is easy to enter the inner cavity of the pressure gauge, which will not only affect food hygiene after a long time, but also cause the problem of inaccurate measurement of the inner diaphragm pressure gauge.

Although embodiments of the present invention have been shown and described, for those of ordinary skill in the art, it is understood that without departing from the principles and spirit of the present invention, a variety of changes, modifications, substitutions and variants may be made to these embodiments, and the scope of the present invention is defined by the appended claims and equivalents.

The invention claimed is:

1. A combined type inner diaphragm pressure gauge comprising a support seat (10), wherein an accommodating cavity (14) is formed inside the support seat (10), a dial (20) is disposed on top of the support seat (10), the dial (20) is fixedly connected with an upper surface of the support seat (10), a center pin (31) is disposed inside the support seat (10), a pointer (40) is fixedly connected with a top end of the center pin (31), an inner diaphragm (50) is disposed inside the support seat (10), the accommodating cavity (14) is covered by the inner diaphragm (50), and an outer gasket (60) made of flexible material is fixedly connected with an outer side of the inner diaphragm (50), the support seat (10) comprises a top wall (11), a side wall (12) is fixedly connected with a peripheral edge of the top wall (11), a fixing ring (13) is fixedly connected with a lower end of the side wall (12), and a groove (15) is disposed inside the fixing ring (13).

2. The combined type inner diaphragm pressure gauge according to claim 1, wherein an upper surface of the dial (20) is provided with a scale (21), and an upper end of the center pin (31) extends above the dial (20).

3. The combined type inner diaphragm pressure gauge according to claim 1, wherein the inner diaphragm (50) is an elastic metal diaphragm, and the outer gasket (60) is made of one or combination of two of Teflon, silicone rubber, fluorine rubber, perfluor rubber or Buna-N rubber, the inner diaphragm (50) and the outer gasket (60) are directly closely bonded by a couplant together.

4. The combined type inner diaphragm pressure gauge according to claim 1, wherein edges of the outer gasket (60) and the inner diaphragm (50) are clamped together via the groove (15) inside the fixing ring (13).

5. The combined type inner diaphragm pressure gauge according to claim 1, wherein a connecting seat (70) is fixedly connected with an outer surface of the fixing ring (13), a sealing washer (75) is disposed at a junction of the connecting seat (70) and the fixing ring (13), a case (71) is fixedly connected with an upper surface of the connecting seat (70), and a transparent cover (72) is fixedly connected with a top end of the case (71).

6. The combined type inner diaphragm pressure gauge according to claim 5, wherein the upper surface of the case (71) is provided with an annular gland (74), and the transparent cover (72) is located below the annular gland (74).

7. A mounting assembly, comprising a combined type inner diaphragm pressure gauge, and a pressure wall (80) for mounting the pressure gauge, wherein the combined type inner diaphragm pressure gauge comprises a support seat (10), wherein an accommodating cavity (14) is formed inside the support seat (10), a dial (20) is disposed on top of the support seat (10), the dial (20) is fixedly connected with an upper surface of the support seat (10), a center pin (31) is disposed inside the support seat (10), a pointer (40) is fixedly connected with a top end of the center pin (31), an inner diaphragm (50) is disposed inside the support seat (10), the accommodating cavity (14) is covered by the inner diaphragm (50), and an outer gasket (60) made of flexible material is fixedly connected with an outer side of the inner diaphragm (50), the pressure wall (80) is provided with an opening (81) engagable with the connection seat (70), and the opening (81) communicates with a pressure zone (82) inside the pressure wall (80); and wherein the connecting seat (70) of the pressure gauge is engaged in the opening (81), and the outer gasket (60) faces the pressure zone (82) inside the pressure wall (80), thereby a pressure source at the pressure zone (82) directly applies pressure to the outer gasket (60) and the inner diaphragm (50).

8. The mounting assembly according to claim 7, wherein the support seat (10) comprises a top wall (11), a side wall (12) is fixedly connected with a peripheral edge of the top wall (11), a fixing ring (13) is fixedly connected with a lower end of the side wall (12), and a groove (15) is disposed inside the fixing ring (13).

9. The mounting assembly according to claim 7, wherein an upper surface of the dial (20) is provided with a scale (21), and an upper end of the center pin (31) extends above the dial (20).

10. The mounting assembly according to claim 7, wherein the inner diaphragm (50) is an elastic metal diaphragm, and the outer gasket (60) is made of one or combination of two of Teflon, silicone rubber, fluorine rubber, perfluor rubber or Buna-N rubber, the inner diaphragm (50) and the outer gasket (60) are directly closely bonded by a couplant together.

11. The mounting assembly according to claim 7, wherein edges of the outer gasket (60) and the inner diaphragm (50) are clamped together via the groove (15) inside the fixing ring (13).

12. The mounting assembly according to claim 7, wherein a connecting seat (70) is fixedly connected with an outer surface of the fixing ring (13), a sealing washer (75) is disposed at a junction of the connecting seat (70) and the fixing ring (13), a case (71) is fixedly connected with an upper surface of the connecting seat (70), and a transparent cover (72) is fixedly connected with a top end of the case (71).

13. The mounting assembly according to claim 12, wherein the upper surface of the case (71) is provided with an annular gland (74), and the transparent cover (72) is located below the annular gland (74).

* * * * *